(No Model.)
W. R. BAKER.
DRAFT EQUALIZER.
No. 304,400. Patented Sept. 2, 1884.
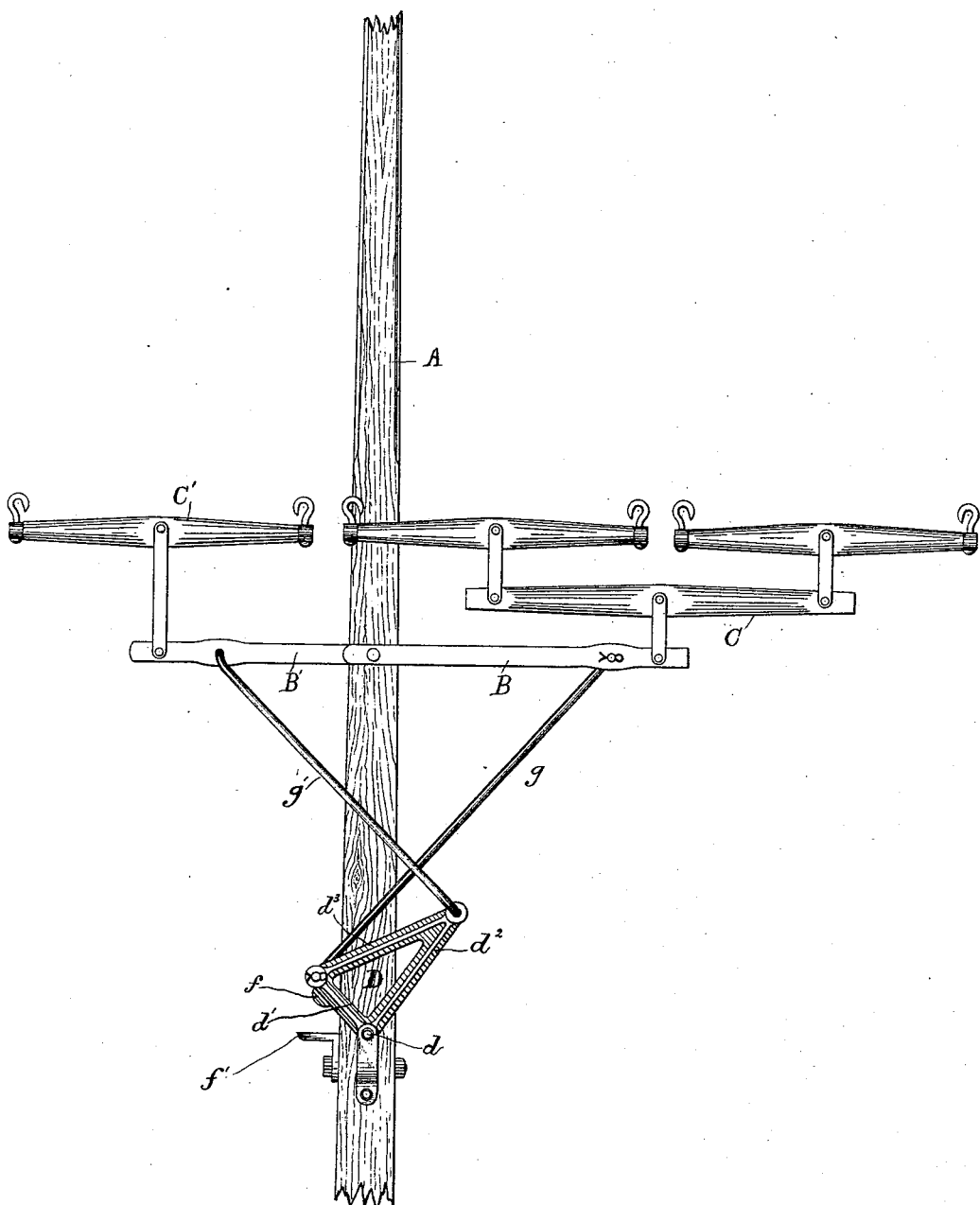
WITNESSES
INVENTOR
William R. Baker.
By his Attorneys

UNITED STATES PATENT OFFICE.

WILLIAM R. BAKER, OF CHICAGO, ILLINOIS, ASSIGNOR TO THE McCORMICK HARVESTING MACHINE COMPANY, OF SAME PLACE.

DRAFT-EQUALIZER.

SPECIFICATION forming part of Letters Patent No. 304,400, dated September 2, 1884.

Application filed February 11, 1884. (No model.)

*To all whom it may concern:*

Be it known that I, WILLIAM R. BAKER, of Chicago, in the county of Cook and State of Illinois, have invented certain new and useful Improvements in Draft-Eveners, of which the following is a specification.

The invention relates, particularly, to eveners for three-horse teams, although it will be obvious from the description that it may be beneficially used with a larger, or even with a smaller, team. For the purpose of illustrating its application, a three-horse evener has been selected. Heretofore such eveners have been constructed by pivoting to the draft-tongue two unequal arms or levers normally in line with each other, extending on opposite sides of the tongue, the outer end of the longer arm receiving the double-tree for the span of horses, and the outer end of the shorter arm receiving the single-tree for the third horse. Links or chains connected these draft-arms or "draft-levers," as I will call them, with a compensating device on the tongue behind them, sometimes a pivoted bar, to which the links were attached at varying distances from the pivot, and sometimes a pulley with two unequal faces, upon which the chains were wound with the fluctuations in the draft. These compensating devices have been open to objections—the rigid bar because it would occasionally be swung into such a position as to lock the links or bring them on a dead-center, and the pulley because of its rapid wear and general unreliability.

In my invention are retained the main features above referred to; but I pivot upon the tongue an elbow-lever instead of the rigid bar or pulley, placing the pivot at the angle of said elbow-lever and carrying the link from the longer draft-lever supporting the double-tree to the end of the shorter arm of this elbow-lever, and the link from the draft-lever which supports the single-tree to the longer arm of the elbow-lever, proportioning these arms in such manner as to bring the draft-levers in equilibrium. I further so arrange the elbow-lever that the links from the draft-levers will cross each other in reaching their respective arms, and, to add still greater security to the structure, and prevent springing and bending of the arms of the elbow-lever, I connect their ends by a bar, which may be cast integral with them, thus forming the lever as a triangular casting.

The drawing represents a plan view of a three-horse draft-evener constructed in accordance with my invention.

A is the pole or tongue; B, the longer draft-lever, and B' the shorter. To the outer end of the longer lever is pivoted or link-connected the double-tree C, carrying the whiffletrees for the span of horses, and to the outer end of the shorter draft-lever is link-connected a single-tree, C', for the third horse, the two draft-levers being normally in line with each other, and the three single-trees preferably also so arranged by the interposition of links of varying length. Upon the tongue, at some distance behind the draft-levers, is pivoted the elbow-lever or triangle D, its pivot $d$ being arranged at the angle between its two lever-arms, of which the arm $d'$ is the shortest and the arm $d^2$ the longest. These arms are connected by a cross-bar, $d^3$, which may be said to form the hypotenuse of the triangle, the whole preferably being a casting of malleable iron. Near the end of the shorter arm may be placed a shoulder, $f$, which will come against a stop, $f'$, behind the pivot whenever the triangle is turned too far by unequal draft, and will prevent its passing beyond an effective position. A link, $g$, connects the outer end of the longer draft-lever with the outer end of the shorter arm of the elbow-lever, and another link, $g'$, connects the outer end of the shorter draft-lever with the outer end of the longer arm, said arms being proportioned, as above stated, to compensate for and to bring into equilibrium the differing power of the two draft-levers. To lessen the liability of interference between the links, or of their passing the dead-center, the triangle or elbow-lever is so arranged that to reach their respective arms these links cross each other, which also brings the line of draft more effectively upon the lever-arms.

I do not claim, broadly, connecting the draft-levers of the evener with a compensating device upon the tongue, since this, as already stated, I know to be old; but

What I do claim, and desire to secure by Letters Patent, is—

1. The combination, to form a draft-evener, of the independent and unequal draft-levers pivoted to the tongue, the single-trees connected mediately and immediately to said levers, the elbow-lever pivoted to the tongue behind the draft-levers and having unequal arms, and the links connecting the outer ends of the respective draft-levers with the converse arms of the elbow-lever.

2. The combination, to form a draft-evener, of the independent and unequal draft-levers pivoted to the tongue, the double-tree connected to the outer end of the longer lever and carrying two whiffletrees, the single-tree connected to the outer end of the shorter lever, the elbow-lever pivoted to the tongue behind the draft-levers and having unequal arms, and the links connecting the outer ends of the draft-levers with the converse arms of the elbow-lever.

3. The combination, to form a draft-evener, of the independent and unequal draft-levers pivoted to the tongue, the single-trees mediately and immediately pivoted to the outer ends of the respective levers, the elbow-lever pivoted to the tongue behind the draft-levers and having unequal arms connected by a cross-piece to strengthen and brace them, and the links connecting the outer ends of the respective levers with the converse arms of the elbow-lever.

4. The combination, to form a draft-evener, of the independent and unequal draft-levers pivoted to the tongue, the single-trees mediately and immediately connected to the outer ends of these draft-levers, the elbow-lever pivoted to the tongue behind the draft-levers and having unequal arms, and the links connecting the outer ends of the draft-levers to the converse arms of the elbow-lever under such arrangement that said links cross each other to reach their respective connections.

5. The combination, substantially as hereinbefore set forth, of the independent and unequal draft-levers pivoted to the tongue, the single-trees carried mediately and immediately by said draft-levers, the elbow-lever pivoted to the draft-tongue behind the draft-levers and having unequal arms, the links connecting the draft-levers with the converse arms of the elbow-lever, the shoulder on the elbow-lever, and the stop upon the draft-tongue.

WILLIAM R. BAKER.

Witnesses:
W. S. HYDE,
JOHN V. A. HASBROOK.